(12) United States Patent
Abe et al.

(10) Patent No.: US 9,990,039 B2
(45) Date of Patent: Jun. 5, 2018

(54) ELECTRONIC DEVICE

(71) Applicants: PIONEER CORPORATION, Kanagawa (JP); TOHOKU PIONEER CORPORATION, Tendo-shi, Yamagata-ken (JP)

(72) Inventors: Makoto Abe, Tendo (JP); Toshiya Kosaka, Tendo (JP)

(73) Assignees: PIONEER CORPORATION, Kanagawa (JP); TOHOKU PIONEER CORPORATION, Yamagata (JP)

( * ) Notice: Subject to any disclaimer, the term of this patent is extended or adjusted under 35 U.S.C. 154(b) by 0 days. days.

(21) Appl. No.: 14/431,311

(22) PCT Filed: Sep. 27, 2012

(86) PCT No.: PCT/JP2012/074981
§ 371 (c)(1),
(2) Date: Mar. 26, 2015

(87) PCT Pub. No.: WO2014/049794
PCT Pub. Date: Apr. 3, 2014

(65) Prior Publication Data
US 2015/0241971 A1    Aug. 27, 2015

(51) Int. Cl.
*G06F 3/01* (2006.01)
*G06F 3/041* (2006.01)
(Continued)

(52) U.S. Cl.
CPC .......... *G06F 3/016* (2013.01); *G06F 3/03547* (2013.01); *G06F 3/0414* (2013.01);
(Continued)

(58) Field of Classification Search
CPC ..... G06F 3/016; G06F 3/0414; G06F 3/03547
(Continued)

(56) References Cited

U.S. PATENT DOCUMENTS 7,312,791 B2    12/2007  Hoshino et al.
8,305,349 B2 *  11/2012  Nakamura .......... G06F 3/03547
                                                        345/156
(Continued)

FOREIGN PATENT DOCUMENTS

JP    61-241823     10/1986
JP    2004-86733    3/2004
(Continued)

OTHER PUBLICATIONS

International Search Report—PCT/JP2012/074981—dated Jan. 8, 2013.
(Continued)

*Primary Examiner* — Michael Pervan
(74) *Attorney, Agent, or Firm* — Young & Thompson (57) ABSTRACT

By the feedback including a factor of vector, the operational feeling of a user in a touch input is improved. In the electronic device, the user performs an input by making a contact body such as a finger contacts a contact face serving as a touch pad to move the contact body. The contact face is supported by a housing, and a drive device moves the contact face with respect to the housing. The control unit obtains the position information including the contact position of the contact body with the contact face and the information indicating the movement of the contact position, and moves the contact face based on the obtained position information when the contact body contacts the contact face.

5 Claims, 9 Drawing Sheets (51) Int. Cl.
*G06F 3/0354* (2013.01)
*G06F 3/0484* (2013.01)
*G06F 3/0481* (2013.01)

(52) U.S. Cl.
CPC ........ *G06F 3/0416* (2013.01); *G06F 3/04812* (2013.01); *G06F 3/04842* (2013.01)

(58) Field of Classification Search
USPC .................. 178/18.01–19.07; 345/173–178
See application file for complete search history.

(56) References Cited

U.S. PATENT DOCUMENTS

| | | | |
|---|---|---|---|
| 2002/0033795 A1* | 3/2002 | Shahoian | G06F 1/1616 345/156 |
| 2006/0109256 A1 | 5/2006 | Grant et al. | |
| 2008/0062143 A1* | 3/2008 | Shahoian | G06F 1/1616 345/173 |
| 2009/0102805 A1 | 4/2009 | Meijer et al. | |
| 2009/0307588 A1 | 12/2009 | Tauchi et al. | |
| 2011/0057904 A1* | 3/2011 | Yamano | G06F 3/0414 345/174 |
| 2011/0187658 A1* | 8/2011 | Song | G06F 3/041 345/173 |

FOREIGN PATENT DOCUMENTS

| | | |
|---|---|---|
| JP | 2004-094307 | 3/2004 |
| JP | 2008-15671 | 1/2008 |
| JP | 2008-516348 | 5/2008 |
| JP | 2009-294827 | 12/2009 |
| JP | 2011-501298 | 1/2011 |
| WO | 20061042309 | 4/2006 |

OTHER PUBLICATIONS

Japanese Office Action dated Apr. 12, 2016 in corresponding Japanese Patent Application No. 2014-537963 with English translation of Japanese Office Action.

* cited by examiner

ELECTRONIC DEVICE

TECHNICAL FIELD

The present invention relates to an electronic device provided with a touch pad.

BACKGROUND TECHNIQUE

There is known a touch pad provided on a laptop (a note type) PC or the like. A touch pad is a device used to make an input by a touch with a finger, and detects a contact position of the finger.

Patent Reference 1 discloses a touch pad provided with a film-type switch at its undersurface. A user selects a specific command by operating the touch pad with normal pressure force, and then makes an input for executing the command by pressing the touch pad with pressure stronger than that of the normal operation.

Patent Reference 2 proposes a method of feeding back a sense of touch by generating a vibration by an actuator provided in the touch pad.

PRIOR ART REFERENCE

Patent Reference

Patent Reference 1: Japanese Patent Application Laid-open under No. S61-241823
Patent Reference 2: Japanese Patent Application Laid-open under No. 2008-516348

SUMMARY OF INVENTION

Problem to be Solved by the Invention

By the method of Patent Reference 2, although it is possible to give a feedback to a user by a vibration, such a vibration does not include vector information. Therefore, it is not possible to notify the user of the direction in which the finger is moving. Also, it is not possible to realize such an assisted feeling that the user is guided to a correct direction by a hand of some person.

The above is an example of a problem to be solved by the present invention. It is an object of the present invention to improve an operational feeling of a user during a touch input by providing a feedback considering a factor of vector.

Means for Solving the Problem

The invention described in claim is an electronic device comprising: a contact face contacting with a contact body; a housing supporting the contact face; a drive device moving the contact face with respect to the housing; and a control unit obtaining position information including a contact position of the contact body with the contact face and information indicating movement of the contact position, and controls the drive device to move the contact face based on the position information when the contact body contacts the contact face.

DETAILED DESCRIPTION OF THE PREFERRED EMBODIMENTS

According to one aspect of the present invention, there is provided an electronic device comprising: a contact face contacting with a contact body; a housing supporting the contact face; a drive device moving the contact face with respect to the housing; and a control unit obtaining position information including a contact position of the contact body with the contact face and information indicating movement of the contact position, and controls the drive device to move the contact face based on the position information when the contact body contacts the contact face.

To the above electronic device, a user performs an input by making a contact body such as a finger contact a contact face serving as a touch pad to move the contact body. The contact face is supported by a housing, and a drive device moves the contact face with respect to the housing. The control unit obtains the position information including the contact position of the contact body with the contact face and the information indicating the movement of the contact position. The contact position is position coordinates on the contact face, for example. Also, the position information includes the moving direction and the moving amount of the contact position. When the contact body contacts the contact face, the contact face is moved by the drive device based on the position information.

In one mode of the above electronic device, the control unit outputs an operation image corresponding to the contact face to a display unit. Also, the operation image includes a selection item mark indicating a selection item or a contact position mark indicating the contact position. In this mode, the operation image for displaying the operation to the contact face is displayed on the display unit. The operation image includes a selection item mark such as an icon, or a contact position mark such as a cursor. The user performs the input by moving the contact body on the contact face while watching the operation image.

In another mode of the electronic, the control unit moves the contact face by a predetermined distance in a direction opposite to a moving direction of the contact position until then, when the contact position which has moved on the contact face reaches an area of the selection item mark. In this mode, when the contact position enters the area of the selection item mark, the contact body moves in the direction opposite to the moving direction until then. Therefore, the user can sense that the contact position enters the area of the selection item mark.

In still another mode of the electronic device, the control unit moves the contact face such that the contact position enters an area of the selection item mark, when the contact position which has moved on the contact face reaches a surrounding area of the selection item mark determined in advance. In this mode, when the contact position reaches the surrounding area of the selection item mark, the contact face moves such that the contact position enters the area of the selection item mark. Therefore, the user can easily select the selection item mark by moving the contact position close to the selection item mark.

In still another mode of the electronic device, the control unit moves the contact face such that the contact position moves in a direction opposite to a moving direction of the contact body, when the contact body is released from the contact face. Since the touch pad automatically returns to the initial position while the user releases the finger from the touch pad, the user can repeat the similar operation even if the movable range of the touch pad is limited.

In a preferred example of the above electronic device, the drive device includes a rotation axis having a feed screw, and the rotation power of the drive device is transmitted to the contact face via the rotation axis to move the contact face.

In another preferred example of the above electronic device, a pressure sensor is arranged in a side of the housing of the contact face. Also, in still another preferred example, the contact face is supported by the housing via a support member, and the pressure sensor is arranged between the contact face and the support member.

EMBODIMENTS

A Preferred embodiment of the present invention will be described below with reference to the attached drawings.

Entire Configuration

Figure 1:
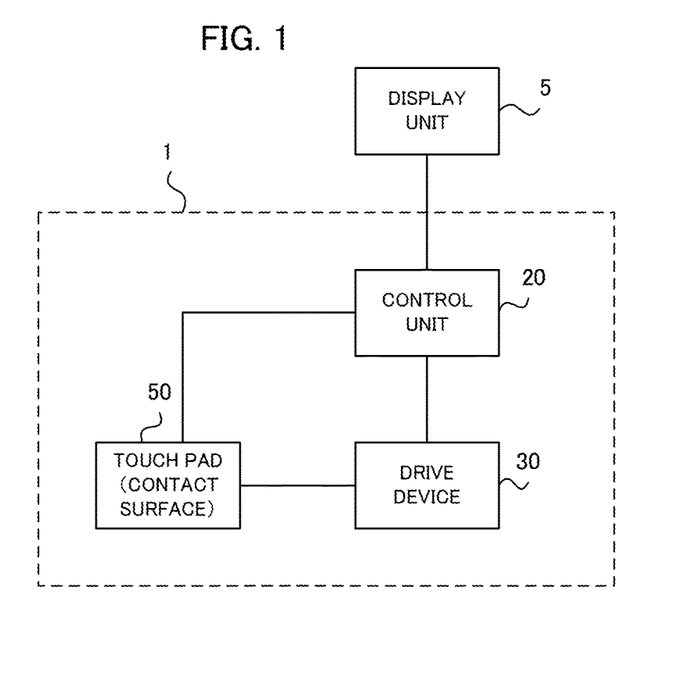
FIG. 1 is a block diagram illustrating a configuration of an electronic device according to an embodiment of the present invention.
Figure 2:
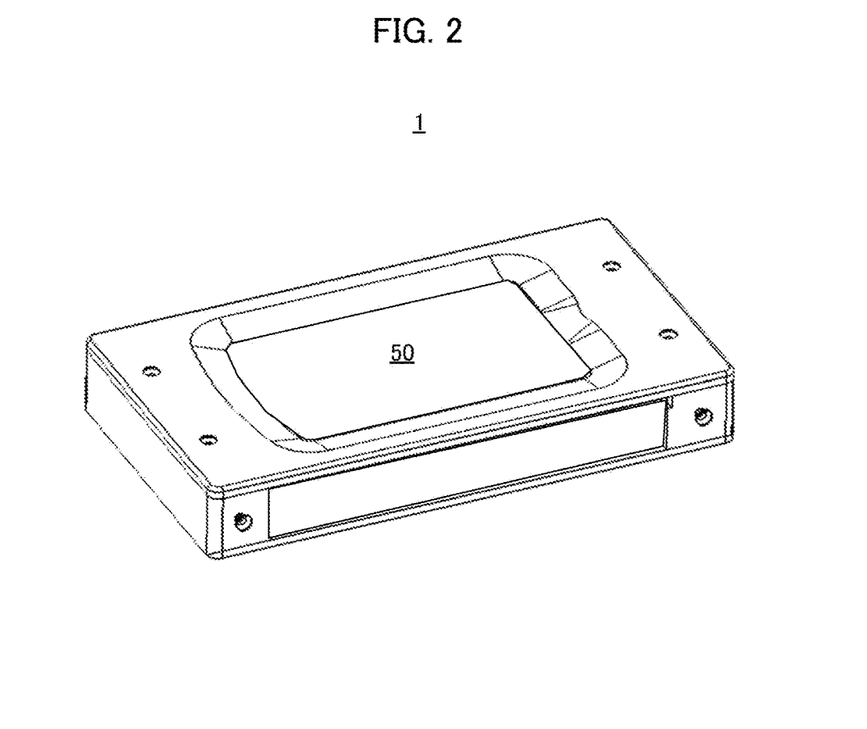
FIG. 2 is a perspective view showing an external appearance of the electronic device.

FIG. 1 is a block diagram illustrating a configuration of an electronic device according to an embodiment of the present invention. FIG. 2 shows an external appearance of the electronic device 1. The electronic device 1 is formed as a small touch input device and is installed in a touch input part of a laptop PC, for example. Preferably, the electronic device 1 may be installed in a steering unit of a vehicle and used as an input device operated by a driver while watching an operation image displayed on a display of a navigation device or a head-up display serving as a display unit.

Specifically, the electronic device 1 includes a control unit 20, a drive device 30 and a touch pad (contact face) 50. The electronic device 1 is connected to display unit 5. The control unit 20 outputs an operation image including icons, serving as examples of selection items for an operational input, to the external display unit 5 to be displayed. Thus, a user can watch the operation image including the icons.

As the touch pad 50, a known touch pad of an electrostatic type or a pressure sensitive type may be used. The touch pad 50 detects the coordinates of the position where the user contacts the contact face by a contact body such as a finger, and supplies the position coordinates to the control unit 20.

The drive device 30 includes a mechanism to move the touch pad 50 in a direction along its contact face. The specific structure of the drive device 30 will be described later.

The control unit 20 outputs the operation image data to the external display unit 5 to display the operation image, and obtains the contact position of the contact body from the touch pad 50 to recognize the user's input to the touch pad 50. The control unit 20 displays a cursor indicating the contact position in the operation image displayed on the display unit 5 based on the contact position obtained from the touch pad 50.

Also, the control unit 20 analyzes the moving direction and the moving amount of the contact position based on the contact position obtained from the touch pad 50. Then, the control unit 20 controls the drive device 30 to move the touch pad 50 based on the contact position of the contact body, the moving distance and the moving amount of the contact position. Thus, the touch pad 50 moves as necessary while the user is making the input operation by the finger. The movement of the touch pad 50 by the drive device 30 will be described later.

Figure 3A:
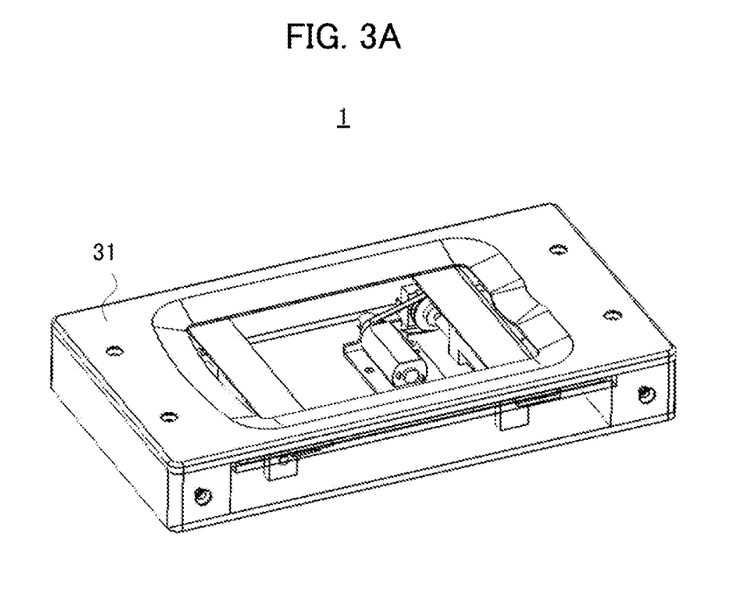
FIGS. 3A and 3B are perspective views showing the internal structure of the electronic device.

Next, the structure of the drive device 30 will be described. FIG. 3A is a perspective view showing an external appearance of the electronic device 1. In FIG. 3A, the portion of the touch panel 50 is made transparent to partly show the internal structure. The drive device 30 is provided inside the housing 31 of the electronic device 1.

Figure 3B:
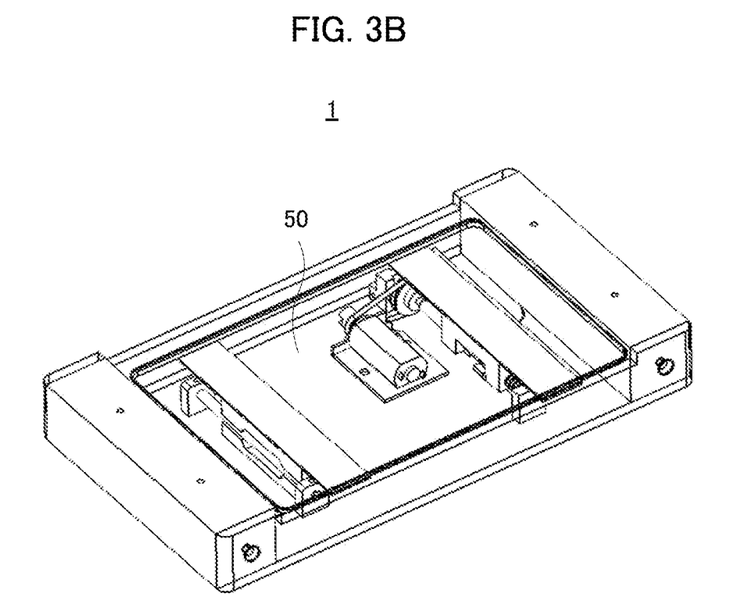

FIG. 3B shows the electronic device 1 in a state in which the upper cover of the housing 31 is removed. Under the upper cover of the housing 31, the touch pad (the contact face) 50 is provided.

Figure 4A:
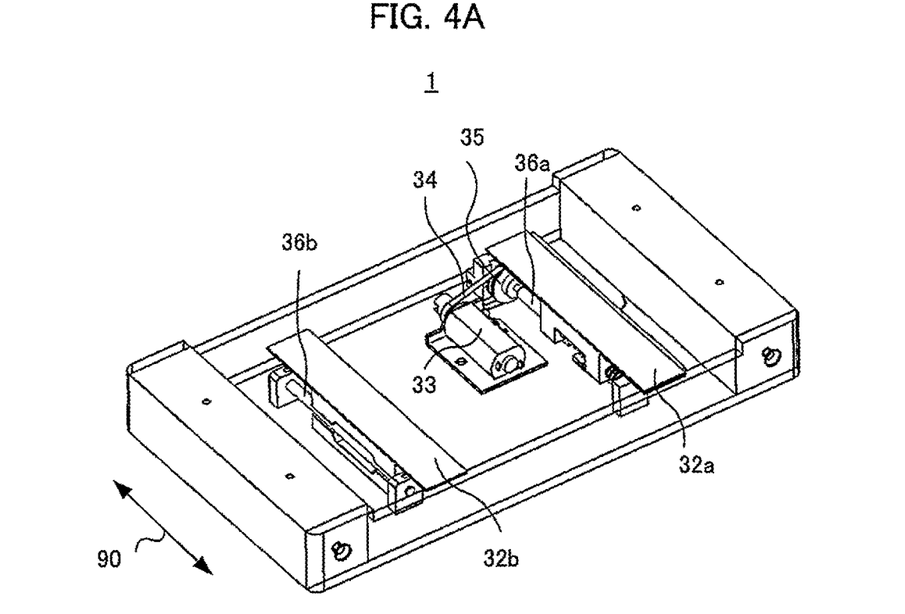
FIGS. 4A and 4B are perspective views showing the structure of a drive device.

FIG. 4A shows the electronic device 1 in a state in which the touch pad 50 is also removed, i.e., the internal structure constituting the drive device 30. Under the touch pad 50, there is provided a pair of support members 32a and 32b which support the touch pad 50 from the lower side.

Figure 4B:
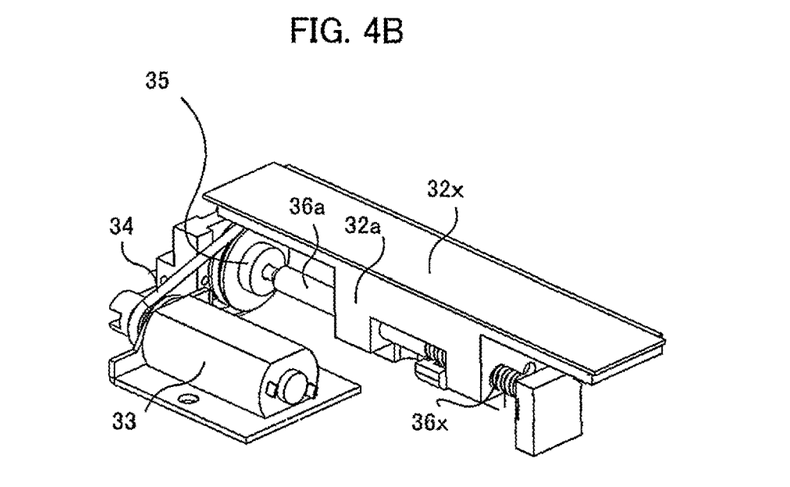

FIG. 4B is an enlarged view of a part of the support member 32a. The support member 32a engages with the rotation axis 36a formed with the feed screw 36x. Namely, the rotation axis 36a is inserted into the holes formed at the lower end portion of the support member 32a. The rotation axis 36a is integrated with the circular rotation body 35, and the rotation body 35 is linked with the motor 33 via the belt 34. The rotation of the motor 33 is transmitted to the rotation body 35 via the belt 34, thereby to rotate the rotation axis 36a integrated with the rotation body 35. Since the feed screw 36x is formed at the tip of the rotation axis 36a, the support member 32a moves in the moving direction 90 shown by the arrow when the rotation axis 36a rotates. Namely, the support member 32a moves by a distance corresponding to the rotation amount of the rotation axis 36a in the direction corresponding to the rotation direction of the rotation axis 36a. The pressure sensor 32x is provided on the upper face of the support member 32a.

Figure 5A:
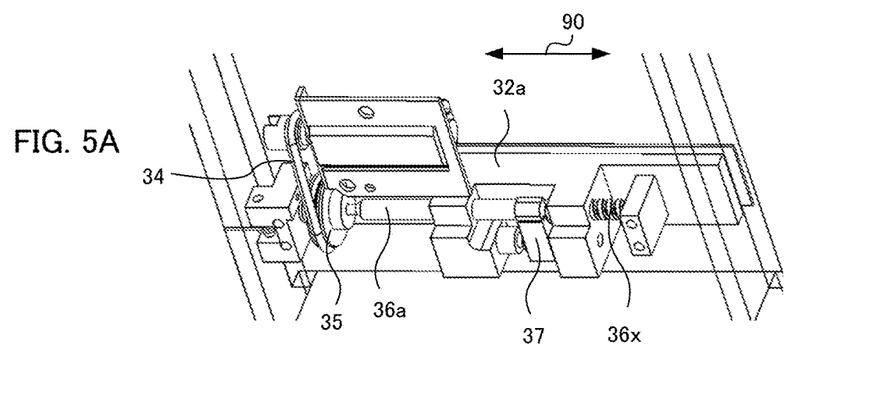
FIGS. 5A to 5C are perspective views showing the structure of the drive device.

FIG. 5A is a perspective view of a part of the support member 32a obliquely from below. It is noted that the illustration of the motor 33 is omitted. The engaging member 37 which engages with the feed screw 36x of the rotation axis 36a is linked with the support member 32a. The engaging member 37 moves in the moving direction 90 by the rotation of the rotation axis 36a, and thereby the support member 32a also moves in the moving direction 90.

Figure 5B:
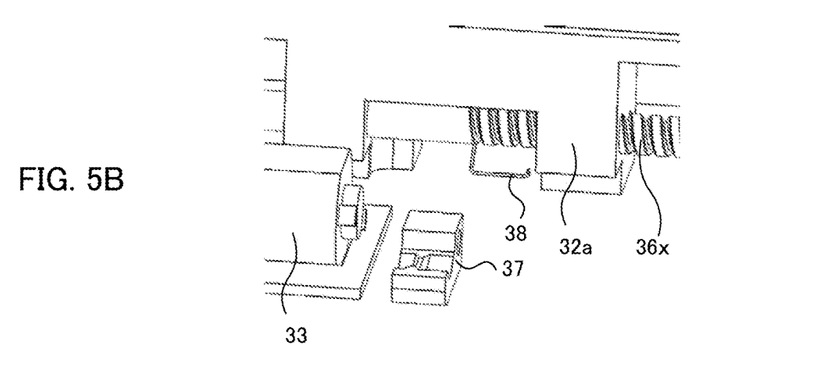

FIG. 5B shows the state in which the engaging member 37 is removed from the support member 32a. The support member 32a is provided with a spring member 38. In a state linked with the support member 32a, the engaging member 37 is urged against the rotation axis 36a by the spring member 38. The urging force of the spring member 38 ensures the engagement of the engaging member 37 with the feed screw 36x of the rotation axis 36.

Figure 5C:
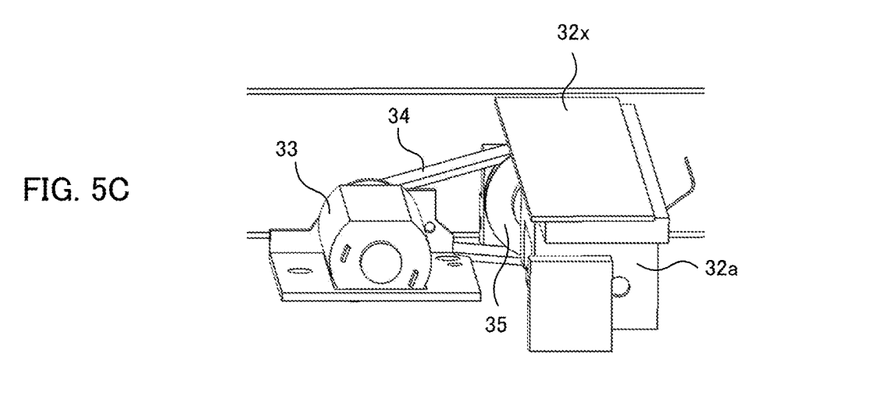

FIG. 5C is a perspective view of a part of the support member 32a viewed obliquely from above. As already mentioned, the pressure sensor 32x is provided on the upper surface of the support member 32a. The pressure sensor 32x detects the pressure force by the contact body such as a finger of the user. For example, when the pressure sensor 32x detects the pressure force equal to or larger than a predetermined value, the control unit 20 may judge it as the determination of selecting the icon.

Figure 6A:
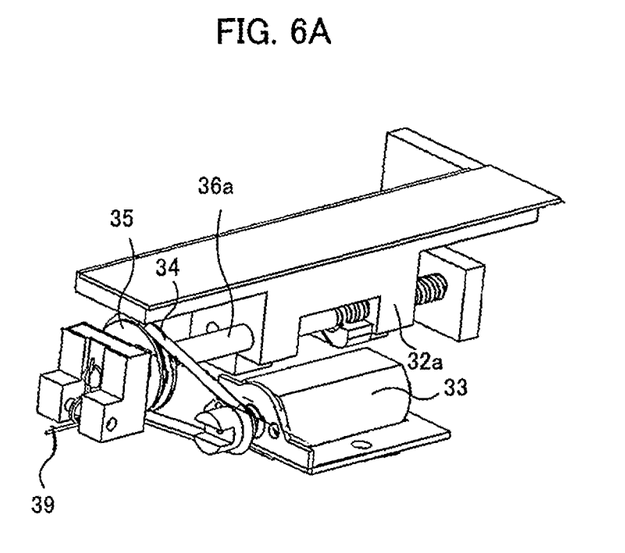
FIGS. 6A and 6B are perspective views showing the structure of the drive device.

FIG. 6A is a perspective view of the motor 33 from the side of the belt 34. A spring member 39 is provided at the end of the rotation axis 36a on the side of the rotation body 35, e.g., outside the rotation body 35. The spring member 39 urges the rotation axis 36a to the side of its end formed with the feed screw 36x. This urging force prevents the backlash of the rotation axis 36a.

Returning to FIG. 4A, the support member 32b is movable on the axis 36b in the moving direction 90. While the rotation force of the motor 33 is not given to the support member 32b, the touch pad 50 is moved by the movement of the support member 32a, and the support member 32b moves on the axis 36b in the moving direction 90 along with the support member 32a.

In this way, by the rotation of the motor 33, the support members 32a, 32b and the touch pad 50 move in the moving direction 90. The control unit 20 controls the motor 33 by supplying the signal indicating the rotation direction and the rotation amount to the motor 33.

Figure 6B:
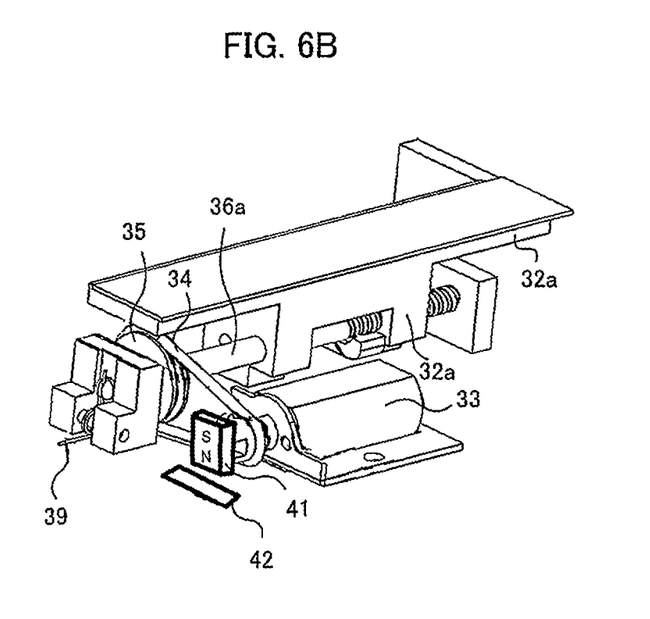

FIG. 6B shows an application of the drive device 30. This application has a structure to initialize the position of the touch pad 50. Specifically, a magnet 41 is attached to the rotation axis of the motor 33. Near the magnet 41, a sensor 42 is provided to detect the magnetic pole of the magnet 41. The sensor 42 detects the magnetic pole of the magnet 41 and transmits it to the control unit 20. The control unit 20 calculates the number of rotation of the motor 33, i.e., how many times the motor 33 rotates.

In the initial state of the touch pad 50, it is desired that the touch pad 50 is located at the center of the moving direction 90, i.e., movable the same amount in both directions. Therefore, as the initialization, the control unit 20 makes the motor 33 rotate in one direction (e.g., rotate right) until the support member 32a reaches the movement limit position, and then makes the motor 33 rotate in the reverse direction (e.g., rotate left) until the support member 32a reaches the movement limit position of the opposite side. The control unit 20 calculates the number of rotation of the motor 33 corresponding to this movement to calculate the number of rotation of the motor 33 (hereinafter referred to as "movable number of rotation") corresponding to the movable range of the support member 32a. Then, the control unit 20 determines the position of the support member 32a, when the motor 33 is rotated a half of the movable number of rotation from the state in which the support member 32a is located at either end of the rotation axis 36a, as the initial position of the support member 32a, i.e., the initial position of the touch pad 50. The control unit 20 executes this initialization of the touch pad 50 when the electronic device 1 is powered on, for example.

Movement Control of Touch Pad

Next, the movement control of the touch pad 50 will be described. The touch pad 50 detects the position of the contact body such as the finger of the user on the touch pad 50, and transmits it to the control unit 20. The control unit 20 detects the movement of the contact position of the contact body, and controls the drive device 30 to move the touch pad 50, during the operation by the contact body, based on the contact position, the moving direction and the moving amount of the contact position (these will be hereinafter referred to as "position information"). Specific moving methods will be described below.

(1st Moving Method)

Figure 7A:
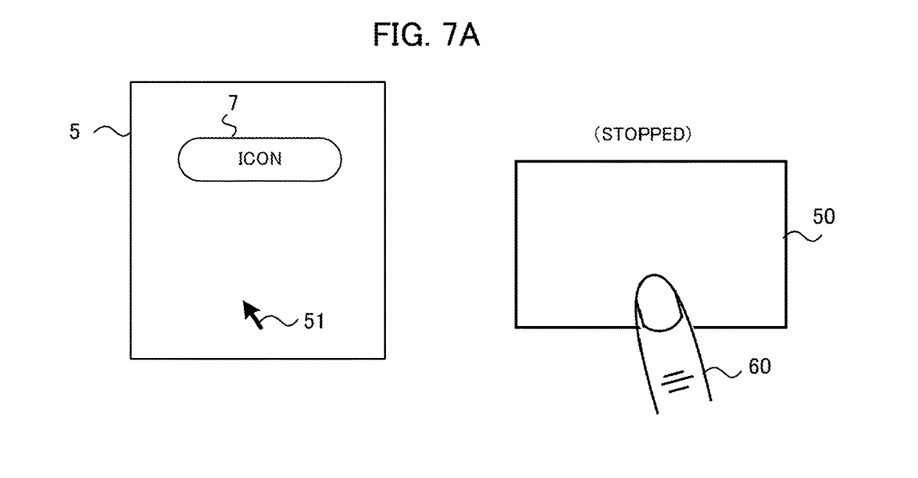
FIGS. 7A to 7C are diagrams for explaining a first moving method of a touch pad.
Figure 7B:
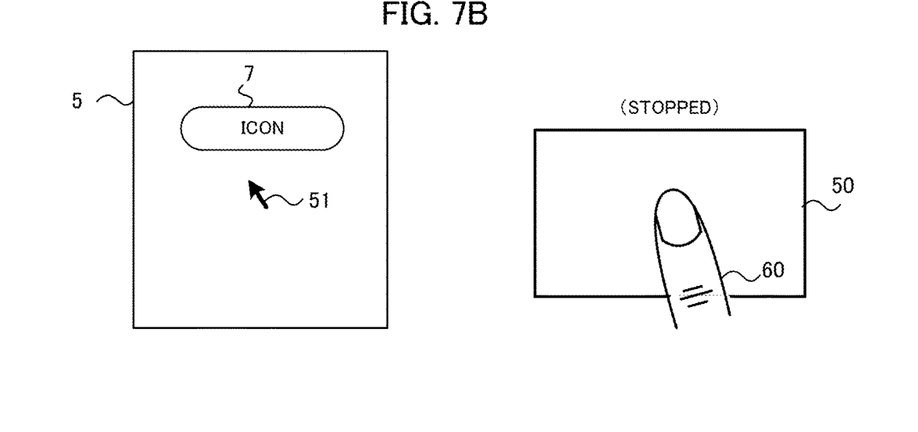
Figure 7C:
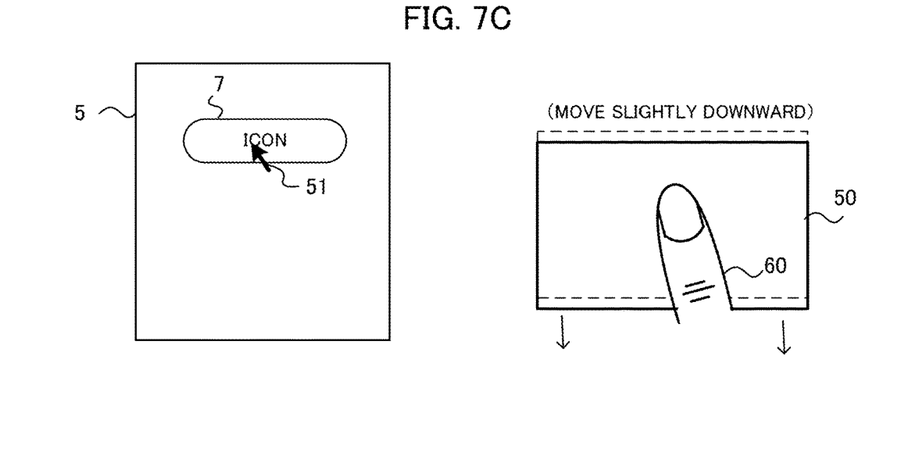

FIGS. 7A to 7C are diagrams for explaining the first moving method of the touch pad 50. In each figure, the left side shows the operation image displayed on the display unit 5, and the right side shows the operation state of the touch pad 50 by the finger 60. In the operation image displayed on the display unit 5, the cursor 51 is displayed at the position corresponding to the finger 60 serving as the contact body. Also, the icon 7 is displayed as the selection item to be selected by the user.

In the first moving method, when the user moves the finger on the touch pad 50 and the cursor 51 reaches the position of the icon 7, the touch pad 50 is slightly moved. First, when the position of the cursor 51 corresponding to the finger 60 is apart from the icon 7 as shown in FIG. 7A, the touch pad 50 is stopped. Thereafter, when the user moves the finger 60 upward as shown in FIG. 7B, the cursor 51 approaches the icon 7 but the touch pad 50 is still stopped. Then, when the user moves the finger 60 further upward and the cursor 51 enters the area of the icon 7 as shown in FIG. 7C, the control unit 20 controls the drive device 30 to move the touch pad 50 slightly downward in FIG. 7C. Thus, it is possible to notify the user that the cursor 51 has reached the position of the icon 7, i.e., the icon 7 becomes the selected state.

In the above example, since the user has moved the finger 60 upward, the touch pad 50 moves slightly downward at the position of the icon 7. Conversely, when the user has moved the finger 60 downward to reach the position of the icon 7, the touch pad 50 moves slightly upward.

In a state where the icon 7 is being selected, the user can decide (fix) the selection of the icon 7 by strongly pressing the touch pad 50 at that position by the finger 60. Specifically, the pressure sensor 32x provided under the touch pad 50 sends the detection signal to the control unit 20 when it detects the pressure equal to or larger than a predetermined value, and the control unit 20 decides (fixes) the selection of the icon 7 existing at the current position of the cursor 51.

In the first moving method, the direction of moving the touch pad 50 is opposite to the direction that the cursor 51 have moved to reach the icon 7, i.e., the direction that the finger 60 has moved. Thus, when the user moves the finger 60 in a direction, the touch pad 50 moves slightly in the opposite direction at a certain position and the user feels as if further movement of the finger 60 is prevented. Thereby, the user can sense that the finger 60 has reached the position selecting the icon 7. This method is particularly effective in such a situation that the user cannot continue gazing the display unit 5 during the operation, e.g., in a case that the electronic device 1 is installed in a steering of a vehicle.

In the first moving method, the amount that the touch pad 50 is moved is determined in advance. Since its purpose is to notify the user that the cursor 51 reaches the position of the icon 7, a small moving amount is enough. Also, considering that the user presses the touch pad 50 to decide the selection of the icon 7 thereafter, it is preferred that the moving amount in the first moving method is equal to or smaller than the width of the icon 7 being selected or the icon 7 of average size. Namely, it is preferred that the moving amount of the touch pad 50 in the first moving method is such a small amount that the cursor 51 is still located within the area of the icon 7 after the movement of the touch pad 50.

(2nd Moving Method)

Figure 8A:
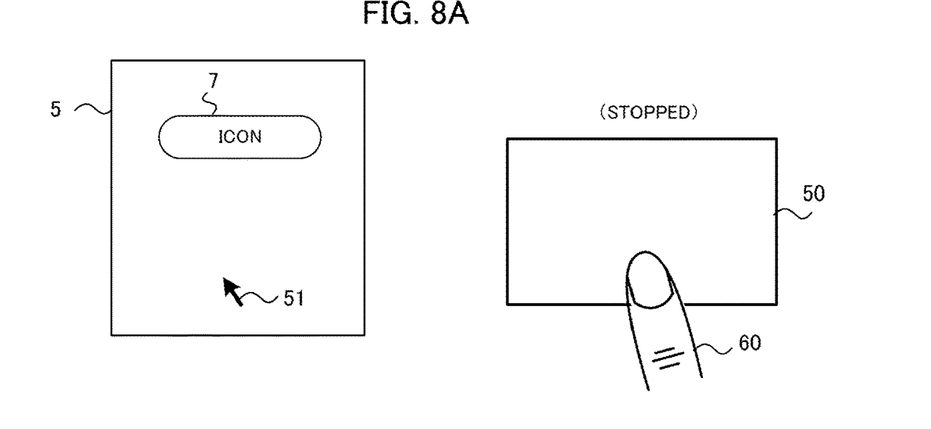
FIGS. 8A to 8C are diagrams for explaining a second moving method of the touch pad.
Figure 8B:
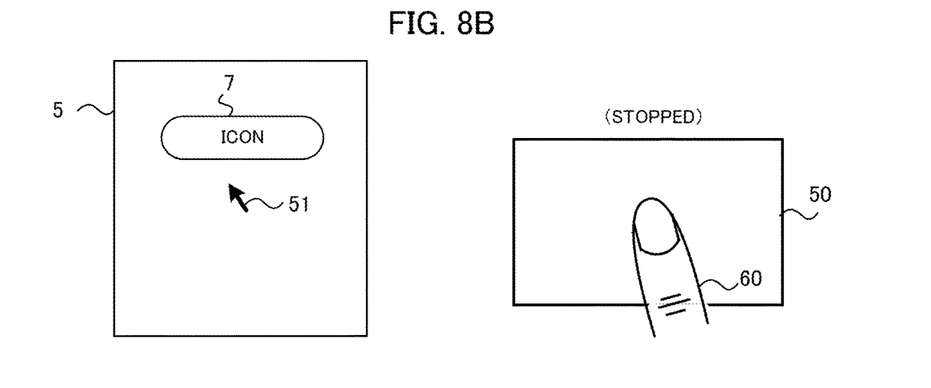
Figure 8C:
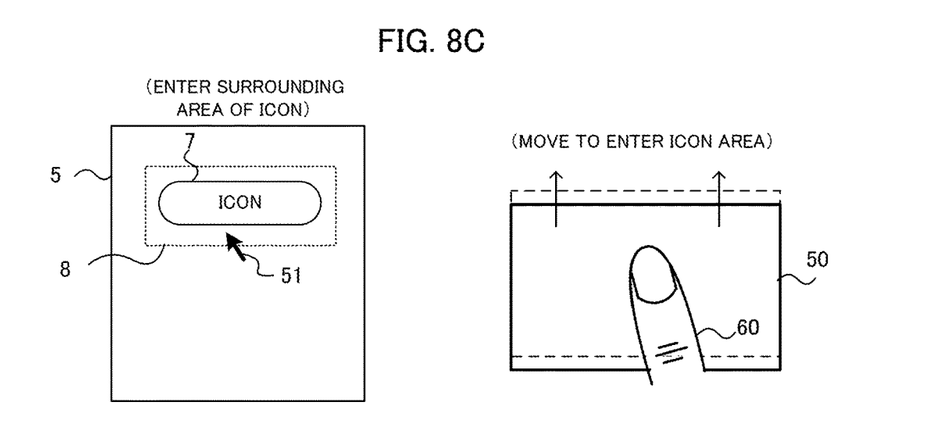

FIGS. 8A to 8C are diagrams for explaining the second moving method of the touch pad 50. In each figure, the left side shows the operation image displayed on the display unit 5, and the right side shows the operation state of the touch pad 50 by the finger 60. In the operation image displayed on the display unit 5, the cursor 51 is displayed at the position corresponding to the finger 60 serving as the contact body. Also, the icon 7 is displayed as the selection item to be selected by the user.

In the second moving method, when the cursor 51 moves to the neighborhood of the icon 7 by the movement of the finger 60 of the user and reaches the surrounding area of the icon 7, the touch pad 50 is moved such that the cursor 51 enters the area of the icon 7. First, when the position of the cursor 51 corresponding to the finger 60 is apart from the icon 7 as shown in FIG. 8A, the touch pad 50 is stopped. Thereafter, when the user moves the finger 60 upward as shown in FIG. 8B, the cursor 51 approaches the icon 7 but the touch pad 50 is still stopped. Then, when the user moves the finger 60 further upward and the cursor 51 enters the predetermined surrounding area 8 of the icon 7 as shown in FIG. 7C, the control unit 20 controls the drive device 30 to move the touch pad 50 upward in FIG. 7C until the position of the cursor 51 enters the area of the icon 7. Thus, it is possible to draw the cursor 51 into the area of the icon 7 when the cursor 51 moves to the surrounding area 8 of the icon 7.

It is noted that the surrounding area 8 of the icon 7 is determined in advance. For example, the surrounding area 8 may be an area outside the icon 7 with a predetermined distance from the icon 7. Also, the surrounding area 8 may be determined for each icon or for each kind of icon.

The moving amount of the touch pad 50 is determined by the control unit 20 based on the position of the cursor 51 and the area of the icon 7. For example, the control unit 20 may calculate the distance between the current position of the cursor 51 and the center position of the target icon 7 to move the cursor 51 by the distance. In this case, the cursor 51 is always drawn into the center position of the target icon 7.

The moving direction of the touch pad 50 is determined in accordance with the positional relation of the cursor 51 and the icon 7 when the cursor 51 enters the surrounding area 8 of the icon 7. In the above example, since the user has moved the finger 60 upward and cursor 51 has entered the surrounding area 8 of the icon 7, the cursor 51 is still below the icon 7 at that time. Therefore, the control unit 20 moves the touch pad 50 upward until the cursor 51 enters the area of the icon 7. On the contrary, when the user has moved the finger 60 downward and the cursor 51 has reached the surrounding area 8 of the icon 7, the cursor 51 is still above the icon 7 at that time, and therefore the control unit moves the touch pad 50 downward until the cursor 51 enters the area of the icon 7.

This method is also particularly effective in such a situation that the user cannot continue gazing the display unit 5 during the operation, e.g., in a case that the electronic device 1 is installed in a steering of a vehicle. When the user moves the cursor 51 to the surrounding area of the desired icon 7, the touch pad 50 moves to draw the cursor 51 into the position of the icon 7. Namely, the movement of the touch pad 50 assists the selection of the icon 7 by the user. Accordingly, it is not necessary for the user to move the finger 60 precisely until the cursor 51 enters the area of the icon 7 with gazing the display unit 5.

(3rd Moving Method)

Figure 9A:
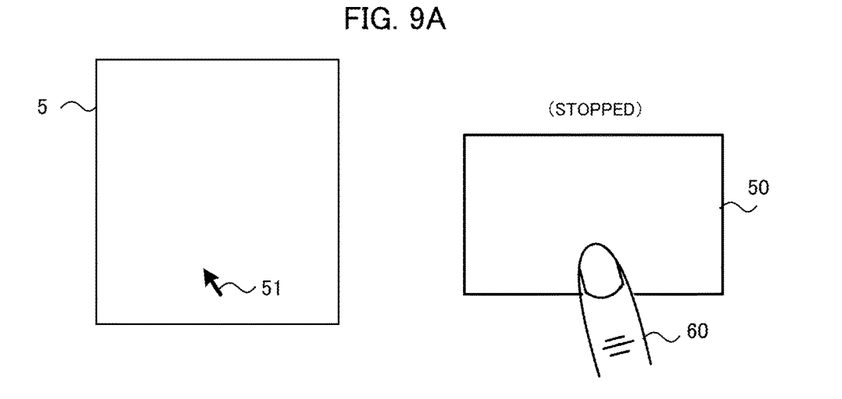
FIGS. 9A to 9C are diagrams for explaining a third moving method of the touch pad.
Figure 9B:
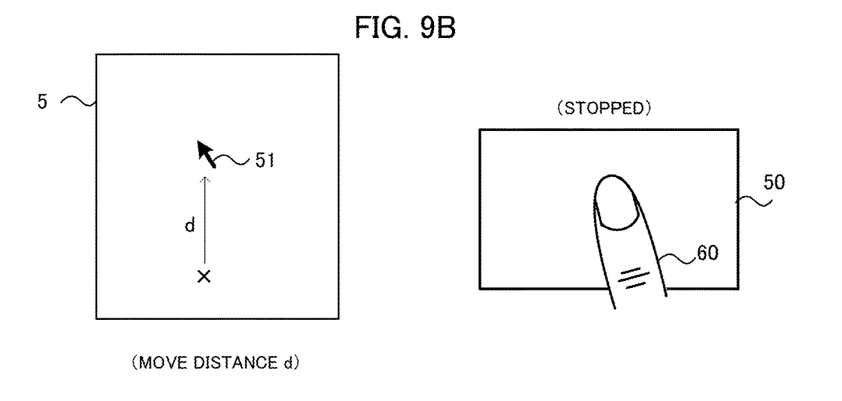
Figure 9C:
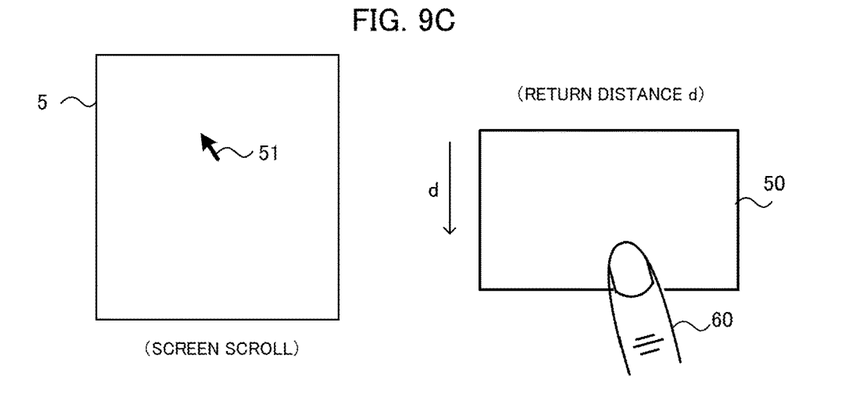

FIGS. 9A to 9C are diagrams for explaining the third moving method of the touch pad 50. In each figure, the left side shows the operation image displayed on the display unit 5, and the right side shows the operation state of the touch pad 50 by the finger 60. In the operation image displayed on the display unit 5, the cursor 51 is displayed at the position corresponding to the finger 60 serving as the contact body.

In the third moving method, the operation image is continuously scrolled. Normally, when the operation image is continuously scrolled using the touch pad, the user needs to release the finger from the touch pad to repeatedly move the finger. For example, when the operation image is scrolled downward, the user contacts the finger at the lower end part of the touch pad to move the finger upward to the upper end part, and then releases the finger from the touch pad once to move the finger from the lower end part of the touch pad to the upper end part again. The user needs to repeat this operation. On the other hand, in the third moving method, the control unit 20 moves the touch pad 50 in the direction opposite to the moving direction of the finger 60 by a predetermined distance when the finger 60 is released from the touch pad 50. Namely, the third moving method includes the operation of returning the touch pad 50 to its initial position when the user releases the finger. Thus, if the position of the touch pad gradually is shifted by the operation pattern of the user, the touch pad returns to its initial position when the user releases the finger. Therefore, the user can repeat the same operation even if the movable range of the touch pad 50 is limited.

Specifically, the user first makes the finger 60 contact the lower end part of the touch pad 50 as shown in FIG. 9A, and then moves the finger 60 upward as shown in FIG. 9B. By this operation, the cursor 51 also moves upward. When the finger 60 is released from the touch pad 50, the control unit 20 moves the touch pad by a predetermined distance d as shown in FIG. 9C. Preferably, the control unit 20 returns the touch pad 50 to its initial position. Thus, if the user's operation pattern gradually shifts the position of the touch pad 50 from its initial position, the touch pad 50 having a limited movable range can be used.

When the cursor 51 reaches the edge of the display area, the control unit 20 may repeatedly move the touch pad 50 upward and downward to perform the shake-like movement, thereby to notify the user that the cursor 51 cannot be moved any more.

When the display area of the display unit 5 displays a map including mountains and the user moves the cursor 51 to get over the uneven mountains, the control unit 20 may set the movement of the touch pad 50 slow and short with respect to the moving amount of the finger 60 before getting over the mountain.

Then, after the cursor 51 gets over the mountain, the control unit 20 sets the movement of the touch pad 50 quick and long with respect to the moving amount of the finger. Further, at the position where the cursor 51 stops, the control unit 20 sets the movement of the touch pad 50 "quick" and "short" in the direction opposite to the moving direction of the finger 60. With this control by the control unit 20, the user feels light resistance before the finger 60 gets over the mountain, and feels as if the finger 60 is pulled after the finger 60 gets over the mountain. Then, at the stop position of the cursor 51, the control unit 20 gives the user a light click feeling to assist the user to naturally stop the finger 60.

(Moving Processing of Touch Pad)

Figure 10:
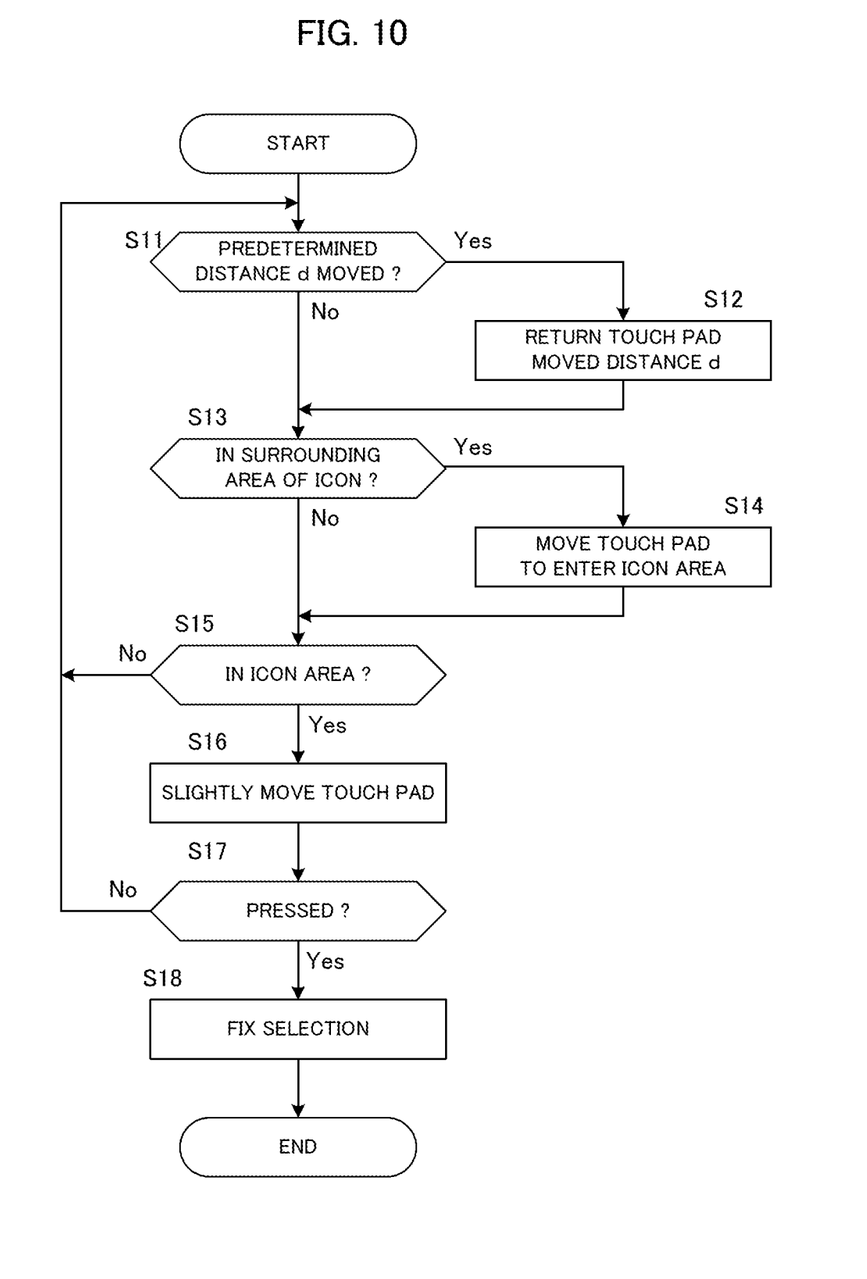
FIG. 10 is a flowchart of moving processing of the touch pad.

Next, an example of the moving processing of the touch pad according to the above-described moving methods will be described. FIG. 10 is a flowchart of the moving processing of the touch pad. This processing is executed by the control unit 20 shown in FIG. 1, which controls the drive device 30 and the touch pad 50. It is noted that the control unit 20 may be configured by a computer, which executes the following processing by executing a program prepared in advance. While the moving processing shown in FIG. 10 executes all the first to third moving methods, the application of the present invention is not limited to this, and anyone or two of the first to third moving methods may be adopted.

First, the control unit 20 obtains the contact position of the contact body in the touch pad 50 from the touch pad 50, and determines whether or not the contact position has moved by the predetermined distance d (step S11). When the contact position has moved by the predetermined distance d (step S11; Yes), the control unit 20 controls the drive device 30 to return the touch pad 50 in the direction opposite to the moving direction of the contact position by the distance d (step S12). This corresponds to the third method described above. On the contrary, when the contact position have not moved by the predetermined distance d (step S11; No), the process goes to step S13.

Next, the control unit 20 determines whether or not the contact position is in the surrounding area 8 of the icon (step S13). When the contact position is in the surrounding area of the icon (step S13; Yes), the control unit 20 controls the drive device 30 to move the touch pad 50 such that the contact position enters the area of the icon (step S14). This corresponds to the second moving method described above. On the contrary, when the contact position is not in the surrounding area of the icon (step S13; No), the process goes to step S15.

Next, the control unit 20 determines whether or not the contact position is in the area of the icon (step S15). When the contact position is in the area of the icon (step S15; Yes), the control unit 20 controls the drive device 30 to move the touch pad 50 slightly in the direction opposite to the moving direction of the contact position until then (step S16). This corresponds to the first moving method described above. Next, the control unit 20 determines whether or not the touch pad 50 is pressed based on the output of the pressure sensor 32$x$ under the touch pad 50 (step S17). This determines whether or not the user has made the input to decide (fix) the selection of the icon currently in the selected state. When the touch pad 50 is pressed (step S17; Yes), the control unit 20 fixes the selection of the icon by the user (step S18), and ends the processing.

On the contrary, when the contact position is not in the area of the icon (step S15; No) or when the touch pad 50 is not pressed (step S17; No), the process returns to step S11.

1st Modified Example

In the embodiment described above, the icon 7 is selected by using the cursor 51. In contrast, as an electronic device in which the icon 7 is selected without using the cursor 51, there is a display unit 5 of a touch panel, in which the user selects the icon 7 by moving the finger on the touch pad 50 to move the icon 7 to a predetermined position. In the control unit 20, it is set that the icon 7 placed in the predetermined position within the display area of the display unit 5 is made the selected state. The present invention is applicable to the display unit 5 which does not use the cursor 51. The selected icon notifies the user that the icon is in the selected state by changing the image of a part of the icon 7 before being selected thereby to display the selection item mark. For example, when the icon 7 reaches the predetermined position of the display unit 5, the frame of the icon 7 (e.g., blue) may be changed to red or the background (e.g., blue) of the icon 7 may be changed to red. Namely, the frame or the background of the icon 7 changed to red becomes the selection item mark.

In a personal computer having a display unit 5 using the cursor 51, the icon 7 is made the selected item by moving the cursor to the icon 7. Namely, the position where the icon becomes the selected item has not been determined in the display area of the display unit 5.

On the contrary, in the case of the display unit 5 which does not use the cursor 51, the position where the icon becomes the selected item has been determined in advance.

Moving Control of Touch Pad

The description overlapping with the embodiment described above will be omitted.

(1st Moving Method)

In the first moving method of the first modified example, when the user moves the finger on the touch pad 50 and the position of the icon 7 displayed on the display unit 5 reaches the predetermined position, the touch pad 50 is slightly moved. Thus, it is possible to notify the user that the icon 7 has reached the predetermined position, i.e., the icon 7 is in the selected state.

(2nd Moving Method)

In the second moving method, when the user moves the finger 60 and the position of the icon 7 displayed on the display unit 5 reaches the surrounding area of the predetermined area, the touch pad 50 is moved such that the icon 7 is moved to the predetermined position.

(3rd Moving Method)

Similarly to the embodiment described above, in the third moving method, the control unit 20 returns the touch pad 50 to the initial position when the finger 60 is released from the touch pad 50. Thus, if the position of the touch pad 50 gradually shifts from its initial position due to the user's operation pattern, the touch pad 50 automatically returns to the initial position while the user is releasing the finger 60 from the touch pad 50. Therefore, the user can repeat the same operation even if the movable range of the touch pad is limited.

2nd Modified Example

While the drive device 30 moves the touch pad 50 in both upward and downward directions in the operation image in the above embodiment, the present invention is not limited to this, and the drive device 30 may move the touch pad 50 in both left and right directions in the operation image. Also, the drive device 30 may have such a structure that the touch pad 50 is movable in two-axes directions, and the touch pad 50 may be moved in two-axes directions, i.e., upward, downward, left and right.

While the finger of the user is mentioned as the contact body that contacts the touch pad, other object such as a touch pen or a stylus may be used as the contact body.

INDUSTRIAL APPLICABILITY

This invention can be used as an input unit of a terminal device such as a PC, and can also be used as an operation device of a navigation device or a head-up display when installed in a steering part of a vehicle.

DESCRIPTION OF REFERENCE NUMBERS

1 Electronic device
5 Display unit
20 Control unit
30 Drive device
50 Touch pad

The invention claimed is:

1. An electronic device comprising:
a touch pad including a contact face with which a contact body contacts, the contact face having an initial position;
a housing which supports the touch pad;
a drive device which moves the touch pad with respect to the housing, and includes a support member that supports the touch pad against the contact face from below; and
a control unit which obtains position information including a contact position of the contact body with the contact face and information indicating movement of the contact position in a moving direction along a plane of the contact face, and controls the drive device to move the contact face based on the position information while the contact body is in contact with the contact face,
wherein the control unit outputs an operation image data to an external display unit, and moves the contact face in a direction opposite to the moving direction of the contact position in a direction in parallel with the plane of the contact face to return the contact face to the initial position after the contact body is released from the contact face.

2. The electronic device according to claim 1, wherein the drive device includes a rotation axis provided with a feed screw that engages with the support member, and
wherein the touch pad is moved by transmitting rotation power of the drive device to the touch pad via the rotation axis.

3. The electronic device according to claim 2, wherein a pressure sensor is arranged on the touch pad on a side of the housing.

4. The electronic device according to claim 3,
wherein the touch pad is supported by the housing via the support member, and
wherein the pressure sensor is arranged between the touch pad and the support member.

5. The electronic device according to claim 1, wherein the electronic device is installed on a steering unit of a vehicle.

* * * * *